(12) United States Patent
Breu

(10) Patent No.: US 8,813,600 B2
(45) Date of Patent: Aug. 26, 2014

(54) APPARATUS FOR MOVING A PLATFORM

(75) Inventor: Christian Breu, Burglengenfeld (DE)

(73) Assignee: Caterpillar Inc., Peoria, IL (US)

( * ) Notice: Subject to any disclaimer, the term of this patent is extended or adjusted under 35 U.S.C. 154(b) by 291 days.

(21) Appl. No.: 13/505,061

(22) PCT Filed: Nov. 5, 2010

(86) PCT No.: PCT/US2010/055719
§ 371 (c)(1),
(2), (4) Date: Apr. 30, 2012

(87) PCT Pub. No.: WO2011/057136
PCT Pub. Date: May 12, 2011

(65) Prior Publication Data
US 2012/0210815 A1 Aug. 23, 2012

(30) Foreign Application Priority Data
Nov. 6, 2009 (EP) .................................. 09252575

(51) Int. Cl.
*E02F 9/16* (2006.01)
*B66C 13/54* (2006.01)

(52) U.S. Cl.
USPC .................. 74/490.01; 296/190.05; 414/680; 414/695.5; 414/917

(58) Field of Classification Search
USPC .......................... 74/490.01; 182/2.9; 212/238; 296/190.05; 414/680, 695.5, 917
See application file for complete search history.

(56) References Cited

U.S. PATENT DOCUMENTS

| 3,298,539 | A | * | 1/1967 | Sundstrom | 212/288 |
| 4,671,387 | A | * | 6/1987 | Bourgeois | 187/244 |
| 4,854,809 | A | * | 8/1989 | Rhodes | 414/685 |
| 7,802,846 | B2 | * | 9/2010 | Bellefleur | 297/284.3 |

FOREIGN PATENT DOCUMENTS

| EP | 0960982 A2 | 1/1999 |
| EP | 1961691 A2 | 8/2008 |
| JP | 2001-260952 A | 9/2001 |
| JP | 2004-092263 A | 3/2004 |
| JP | 2004-249843 A | 9/2004 |
| JP | 2006-009463 A | 1/2006 |

* cited by examiner

*Primary Examiner* — William C Joyce
(74) *Attorney, Agent, or Firm* — Liell & McNeil

(57) ABSTRACT

An apparatus for moving a platform in horizontal and vertical directions relative to a base. The apparatus comprises a parallelogram structure comprising first and second parallelogram linkages each parallelogram linkage comprises first and second link arms and a hydraulic actuator to vary the geometry of the respective parallelogram linkage. A connecting member is connected between the parallelogram linkages to which a first end of each link arm and a first end of each hydraulic actuator are pivotally connected. The first ends of the hydraulic actuators and the first ends of the first link arms are connected to the connecting member along a first pivot axis.

18 Claims, 5 Drawing Sheets

APPARATUS FOR MOVING A PLATFORM

TECHNICAL FIELD

The disclosure relates to apparatus for moving a platform in horizontal and vertical directions relative to a base.

BACKGROUND

Many types of machines, particularly material handling machines, grapple tractors and the like used in the construction industry, comprise some form of operable apparatus and a cab in which the operator sits which are mounted on a base, such as a vehicle body. The operable apparatus may include, for example, a boom to which a grapple, magnet or clam shell or the like is attached. The operator may use controls located in the cab to direct the movement of the apparatus, for example to pick up and transfer material from one place to another.

In some machines the position of the operator cab is fixed to the machine body, which can be disadvantageous in some working environments as the operator's view of the working environment can be impeded by the position of the boom and/or apparatus. To overcome this problem fixed and hydraulic cab risers have been designed to allow the operator to raise the cab to a desired height above the body of the machine to give a better view of the working area.

One example of hydraulic riser apparatus is described in EP-A-0826578 which uses a number of inverted hydraulic cylinders and support arms arranged in a parallelogram linkage between a brace and a bracket member secured to the machine body to elevate the cab. The stability of the apparatus is enhanced in that the hydraulic cylinder is in a retracted position, when the cab is in a raised position which limits unwanted movement or wobble during operation of the machine. Additional hydraulic cylinders are used to increase the amount of lifting force.

However, this type of arrangement only provides means for lifting the cab vertically. JP-A-2007001469, on the other hand, describes a system which enables the cab to not only be raised, but also be lowered to the ground to facilitate operator entry and exit. A parallel linkage mechanism is attached to an arm at the back of the cab, which linkage comprises a pair of arms and hydraulic cylinder. This enables the cab to be moved forward and down as well as up. The arm can be replaced by a second parallel linkage, with a coupling element to the linkages.

However, as the system is designed to extend the cab forward and down to ground level, the structure is a complex design which adds to the cost and difficulty of manufacture. Furthermore the system requires attachment to a revolving super structure.

It is not always required to enable the cab to be extended down to the ground as in the aforemention prior art system, although it is desirous to be able to move the cab forward in a horizontal direction and in a vertical upward direction.

SUMMARY

The disclosure provides apparatus for moving a platform in horizontal and vertical directions relative to a base, said apparatus comprising:

a parallelogram structure comprising first and second parallelogram linkages;

each parallelogram linkage comprising first and second link arms and a hydraulic actuator to vary the geometry of the respective parallelogram linkage;

a connecting member connected between the parallelogram linkages to which a first end of each link arm and a first end of each hydraulic actuator are pivotally connected;

wherein the first ends of the hydraulic actuators and the first ends of the first link arms are connected to the connecting member along a first pivot axis.

An embodiment of the apparatus will now be described, by way of example only, with reference to the accompanying drawings.

The moving apparatus of the present disclosure has many applications. However, for convenience it will be described with reference to a machine which has a cab mounted on a platform which is moveable relative to a base, which is the machine body.

DETAILED DESCRIPTION

Figure 1:
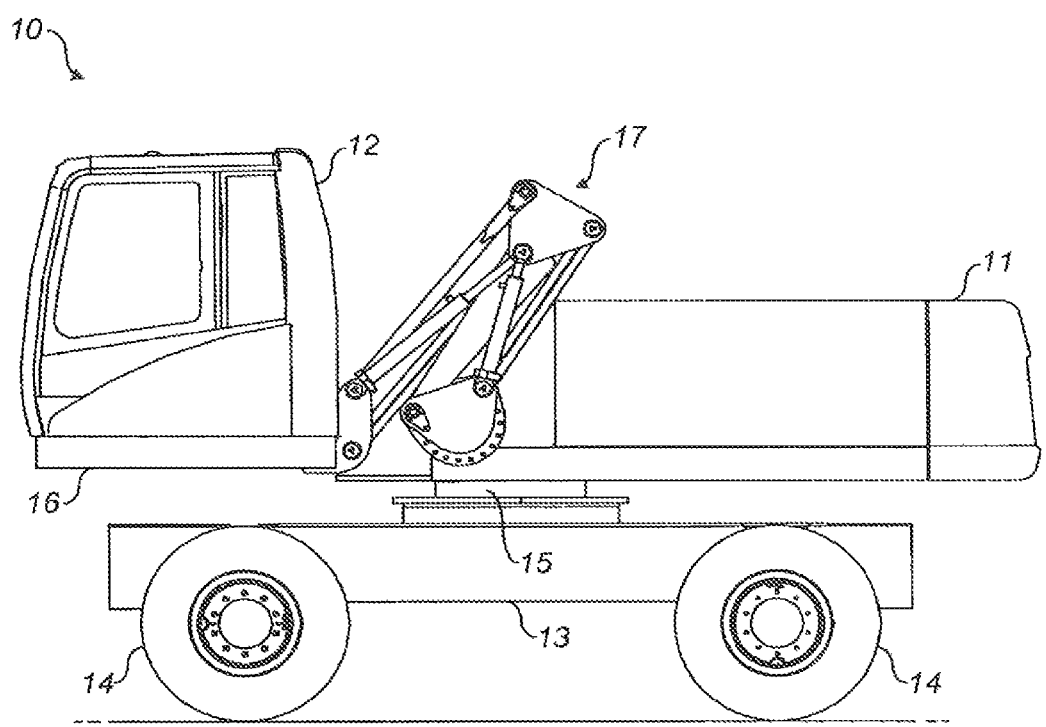
FIG. 1 is a side elevation of a machine having a cab mounted on a platform located at a first position relative to the body of the machine.
Figure 2:
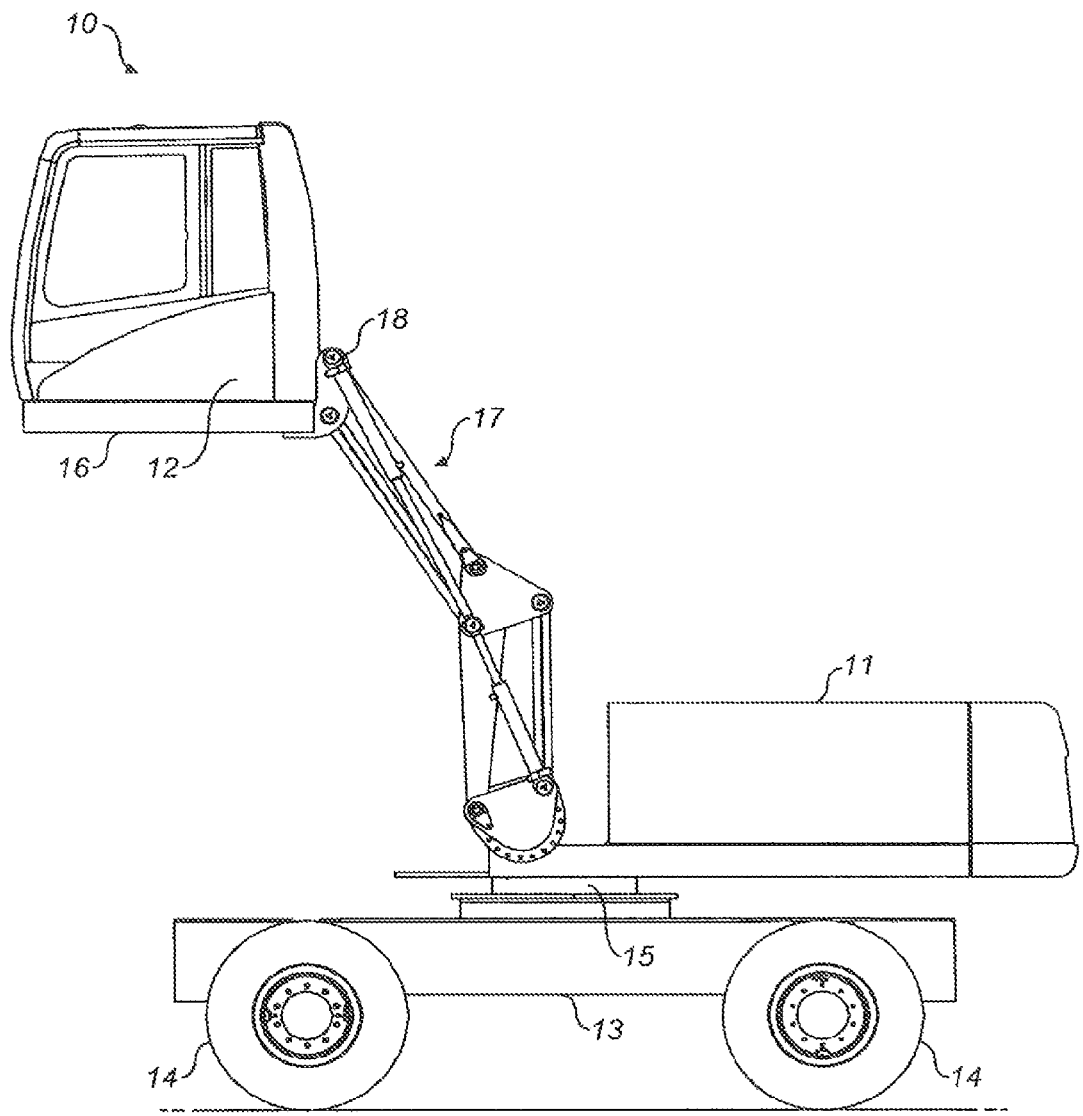
FIG. 2 is a side elevation of the machine of FIG. 1 with the cab raised to an elevated position relative to the machine body.

Referring to FIGS. 1 and 2 there is illustrated a machine 10 which has a body 11 and a cab 12. The body 11 is supported typically by a chassis 13 which, in the case of a vehicular machine, may be mounted on wheels 14 (as shown), or on continuous tracks (not shown). The body 11 may be attached to the chassis 13 by means of a pedestal 15 or other appropriate mounting means.

The cab 12 may be securely mounted on a horizontal platform 16 and may provide a housing in which an operator sits to work the controls for operating the machine 10. A bracket 18, or other attachment means, is provided for connecting one end of the moving apparatus 17 to the platform 16. A supporting member 19 is attached to the body 11 for connecting the other end of the moving apparatus 17 to the body 11. A portion of the body 11 has been removed in FIGS. 1 and 2 in order to more clearly show the moving apparatus 17.

Figure 3:
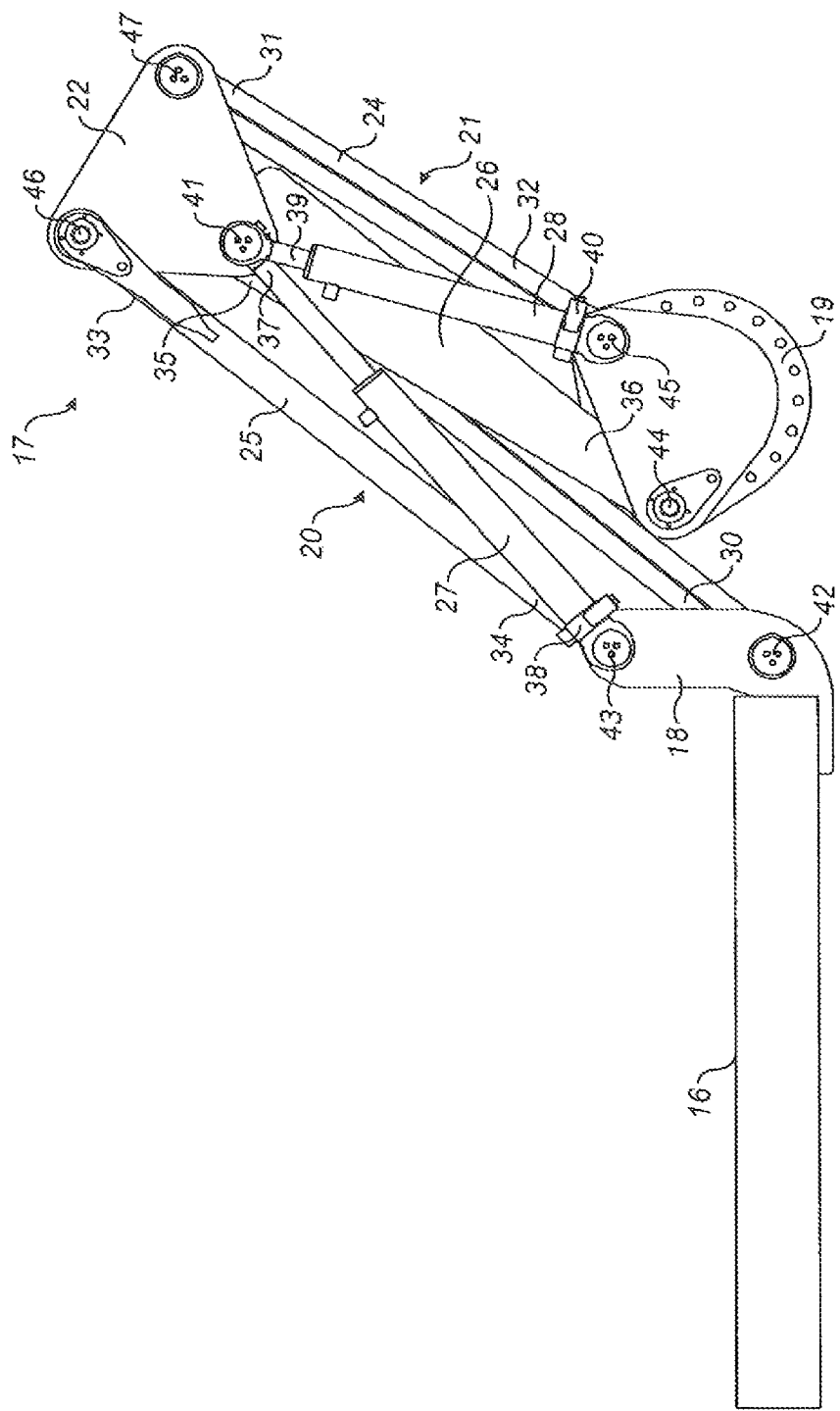
FIG. 3 is a side elevation of the apparatus for moving the cab platform.
Figure 4:
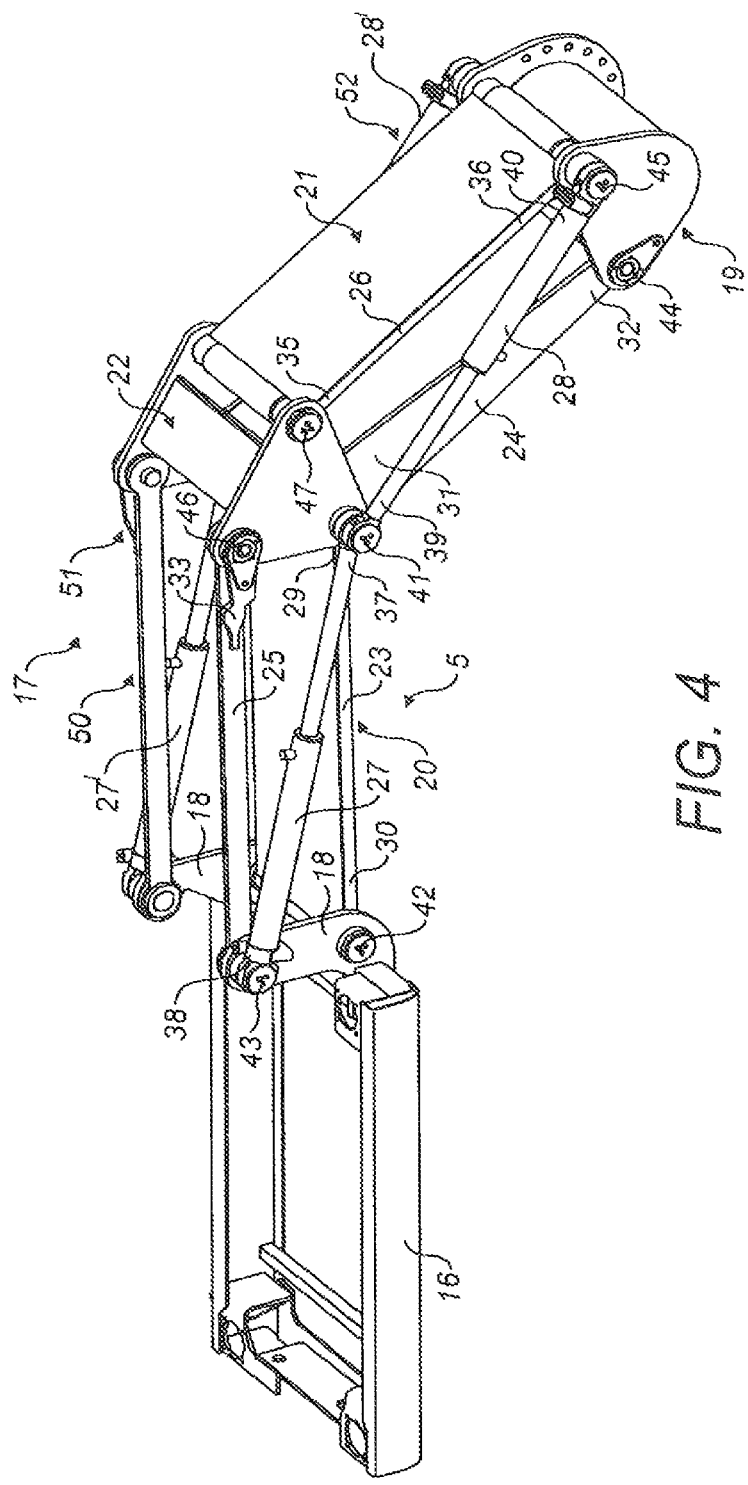
FIG. 4 is a perspective view of the moving apparatus of FIG. 3.

As shown in FIGS. 3 and 4, the moving apparatus 17 is a parallelogram structure 5 (see FIG. 4) comprising a first parallelogram linkage 20 connected in series with a second parallelogram linkage 21 through a connecting member 22. In the embodiment shown, the structure of the parallel linkages 20, 21 is designed to maintain the horizontal orientation of the platform 11 during operation. Each parallelogram linkage 20, 21 may comprise a first link arm 23, 24 and a second link arm 25, 26 and a hydraulic actuator 27,28.

In the embodiment shown, the hydraulic actuators 27, 28 are cylinder actuators which provide a fixed length of straight-line motion. Such actuators typically comprise a tight-fitting piston moving in a closed cylinder. The piston is attached to a rod that extends from one end of the cylinder to provide the mechanical output. The cylinder has a port at each end to admit or return hydraulic fluid. A four-way directional valve may be used in conjunction with the cylinder to connect one cylinder port to the hydraulic supply and the other port to the return, depending on the desired direction of the power stroke.

The hydraulic actuators 27, 28 are operable (preferably independently) to vary the geometry of the parallelogram linkages 20,21 according to which direction (horizontal and/or vertical) the platform 16, and therefore the cab 12 mounted thereon, is to be moved. This is achieved by extension and contraction of the actuators 27, 28 (as described in details below).

Referring to the first parallelogram linkage 20, the first link arm 23 has a first end 29 and a second end 30 and the second link arm 25 has a first end 33 and a second end 34. The hydraulic actuator 27 has a first end 37 and a second end 38.

Referring to the second parallelogram linkage 22, the first link arm 24 has a first end 31 and a second end 32 and the second link arm 26 has a first end 35 and a second end 36. The hydraulic actuator 28 has a first end 39 and a second end 40.

Each of the ends 29, 30, 31, 32, 33, 34, 35, 36, 37, 38, 39, 40 of the link arms 23, 24, 25, 26 and the hydraulic actuators 27, 28 is provided with an eye, or other suitable means, for pivotal connection to the platform bracket 18, the connecting member 22 and/or the supporting member 19 as described below. In the embodiment shown, the bracket 18, the connecting member 22 and the supporting member 19 are provided with a number of apertures which form a total of seven pivot axes 41, 42, 43, 44, 45, 46, 47. A pivot pin inserted through the eyes and apertures forms a pin joint at the pivot axes 41, 42, 43, 44, 45, 46, 47.

The first ends 37, 39 of the hydraulic actuators 27,28 and the first ends 29, 31 of the first link arms 23,24 of each parallelogram linkage 20,21 are all connected to the connecting member 22 along the first pivot axis 41.

The second ends 30, 34 of the link arms 23, 25 of the first parallelogram linkage 20 may be pivotally connected with the platform 16 via the bracket 18 along the second pivot axis 42 and the third pivot axis 43. The second end 38 of the hydraulic actuator 27 of the first parallelogram linkage 20 may also be pivotally connected with the platform 16 via the bracket 18 along the third pivot axis 43.

The second ends 32, 36 of the link arms 24, 26 of the second parallelogram linkage 21 may be pivotally connected with the body 11 via the supporting member 19 along the fourth pivot axis 44 and the fifth pivot axis 45. A second end 40 of the hydraulic actuator 28 of the second parallelogram linkage 21 may also be pivotally connected with the body 11 via the supporting member 19 along the fifth pivot axis 45.

The first ends 33, 35 of the second link arms 25, 26 of the first and second parallelogram linkages 20, 21 may be pivotally connected with the connecting member 22 along the sixth pivot axis 46 and the seventh pivot axis 47.

Operation of the moving apparatus 17 to effect movement of the cab 12 relative to the machine body 11 is illustrated in FIGS. 5 to 13.

Figure 5:
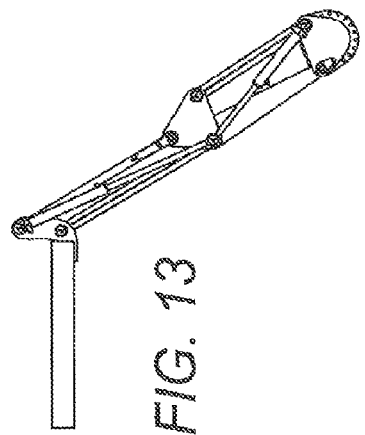
FIGS. 5 to 13 are side elevations of the moving apparatus of FIG. 3 showing different positions to which the cab platform can be moved.

In FIG. 5, the platform 16 is at a "normal" position i.e. lowered. The hydraulic actuators 27, 28 are both in a contracted position.

Figure 6:
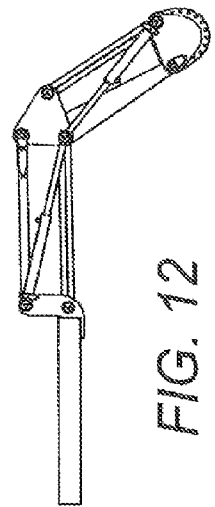
Figure 7:
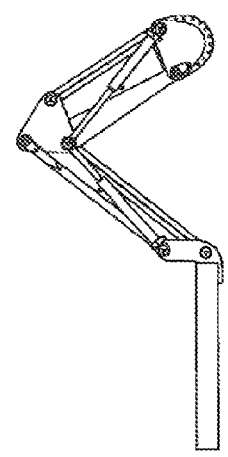
Figure 10:
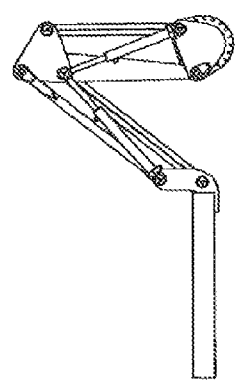
Figure 13:
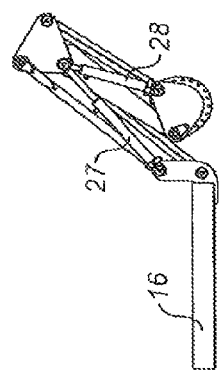

To raise the platform 16 vertically, the hydraulic actuator 28 of the second parallelogram linkage 21 remains contracted, whilst the hydraulic actuator 27 of the first parallelogram linkage 20 extends. This will cause an arcuate movement of the platform 16 with some initial forward movement as shown in FIG. 6, until the hydraulic actuator 27 has extended fully (FIG. 7). Some further height can be gained for the platform 16, by extending hydraulic actuator 28, although this will be accompanied by some forward movement of the platform 16 (FIG. 10). FIG. 13 illustrates the position of the platform when the hydraulic actuator 28 is also fully extended.

Figure 8:
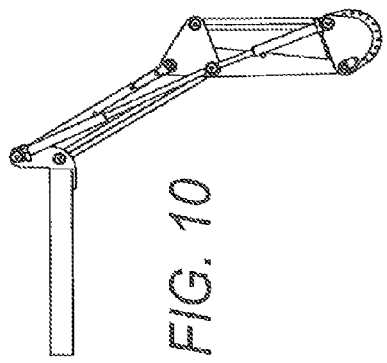
Figure 9:
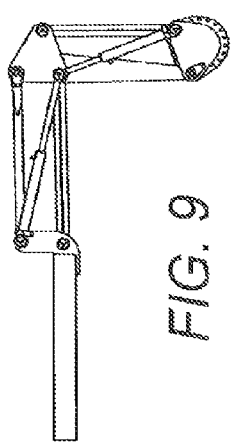
Figure 11:
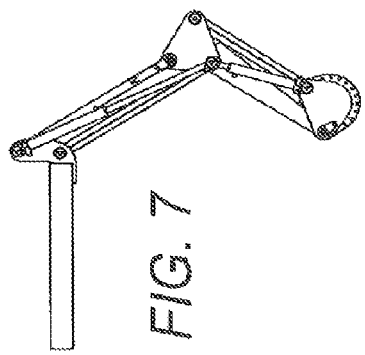
Figure 12:
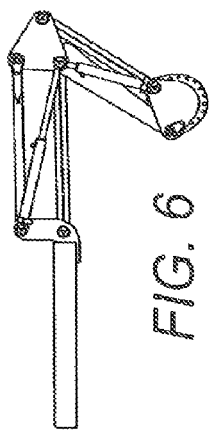

To extend the platform 16 in a horizontal direction from the normal position, the hydraulic actuator 27 of the first parallelogram linkage 20 remains contracted, whilst the hydraulic actuator 28 of the second parallelogram linkage 21 extends. This will cause an arcuate movement of the platform 16 with some initial upward movement as shown in FIG. 8, until the hydraulic actuator 28 has extended fully (FIG. 11). Some further forward extension of the platform 16 can be gained by extending hydraulic actuator 27, although this will be accompanied by some forward movement of the platform 16 (FIG. 12). FIG. 13 illustrates the position of the platform 16 when the hydraulic actuator 27 is also fully extended.

It should be noted that the link arms 23,24,25,26 and hydraulic actuators 27,28 may be connected between the platform 16, connecting member 22 and supporting member 19 in a different configuration from that illustrated. However, it is critical that an end of each hydraulic actuator 27,28 and an end of one link arm 23,24,25,26 from each parallelogram linkage 20,21 is connected to the connecting member 22 along a first pivot axis 41.

In most applications the moving apparatus 17 will require a second parallelogram structure 50 (see FIG. 4) attached with, and arranged in a vertical plane parallel to, first parallelogram structure 5 described above to support the weight of the platform 16 and cab 12 and to maintain their horizontal orientation. This is illustrated in FIG. 4. The second parallelogram structure 50 may provide third 51 and fourth 52 parallelogram linkages having substantially the same construction of link arms and hydraulic actuators as the first and second parallelogram linkages 20, 21. As such the hydraulic actuator 27 of the first parallelogram linkage 20 and the hydraulic actuator 27' of the third parallelogram linkage 51 will be constrained to operate simultaneously. Similarly the hydraulic actuator 28 of the second parallelogram linkage 52 and the hydraulic actuator 28' of the fourth parallelogram linkage 21 will be also constrained to operate simultaneously.

In the embodiment shown the pivot axes 41, 42, 43, 44, 45, 46, 47 extend horizontally from the first parallelogram structure to the second parallelogram structure and a single pivot pin may be used at each pivot axes to form a single pivot joint extending from the first to the second parallelogram structures.

Where two parallel parallelogram structures are used, as in the embodiment shown, some or all of the corresponding pairs of link arms 23,23'; 24,24'; 25,25'; 26,26' in the two structures 5,50 may comprise a single link arm member as is the case with link arms 23,24,26 seen in FIG. 4 for example. The two first link arms 23,23' of the first and third parallelogram linkages 20,50 may in fact comprise a single link member extending from the first to the second comprise parallelogram structure. This may help to provide additional rigidity to the moving apparatus 17 and therefore may further improve its stability.

There are several advantages of using two linked parallelogram structures as described herein which can be moved independently with respect to each other with a single pivot point connecting the hydraulic cylinders from each parallelogram structure and one of the link arms of each parallelogram structure. The main advantage lies in that there is significantly less machinery as fewer parts are required than in prior art designs. This has further benefits in terms of cost and time for manufacture.

The invention claimed is:

1. Apparatus for moving a platform in horizontal and vertical directions relative to a base, said apparatus comprising:
   a parallelogram structure comprising first and second parallelogram linkages;
   each parallelogram linkage comprising first and second link arms and a hydraulic actuator to vary the geometry of the respective parallelogram linkage;
   a connecting member connected between the parallelogram linkages to which a first end of each link arm and a first end of each hydraulic actuator are pivotally connected;
   wherein the first ends of the hydraulic actuators and the first ends of the first link arms are connected to the connecting member along a first pivot axis.

2. Apparatus as claimed in claim 1, wherein the hydraulic actuators are independently operable.

3. Apparatus as claimed in claim 1 wherein the second ends of the link arms of the first parallelogram linkage are pivotally connected with the platform along a second pivot axis and a third pivot axis and a second end of the hydraulic actuator of the first parallelogram linkage is pivotally connected with the platform along the third pivot axis.

4. Apparatus as claimed in claim 1, wherein the second ends of the link arms of the second parallelogram linkage are pivotally connected with the base along a fourth pivot axis and a fifth pivot axis and a second end of the hydraulic actuator of the second parallelogram linkage is pivotally connected with the base along the fifth pivot axis.

5. Apparatus as claimed in claim 1, wherein the first ends of the second link arms of the first and second parallelogram linkages are pivotally connected with the connecting member along a sixth pivot axis and a seventh pivot axis.

6. Apparatus as claimed in claim 1 in which a second end of the first link arm of the first parallelogram linkage is pivotally connected with the platform along a second pivot axis, a second end of the second link arm of the first parallelogram linkage is pivotally connected with the platform along a third pivot axis, a second end of the first link arm of the second parallelogram linkage is pivotally connected with the base along a fourth pivot axis, a second end of the second link arm of the second parallelogram linkage is pivotally connected with the base along the fifth pivot axis, a first end of the second link arm of the first parallelogram linkage is pivotally connected with the connecting member along a sixth pivot axis and a first end of the second link arm of the second parallelogram linkage is pivotally connected with the connecting members along a seventh pivot axis.

7. Apparatus as claimed in claim 1, including:
   a second parallelogram structure arranged in a vertical plane parallel to the first parallelogram structure and comprising third and fourth parallelogram linkages, each of the third and fourth parallelogram linkages comprising first and second link arms and a hydraulic actuator to vary the geometry of the respective third and fourth parallelogram linkage;
   a second connecting member connected between the third and fourth parallelogram linkages to which a first end of each link arm of the second parallelogram structure and a first end of each hydraulic actuator of the second parallelogram structure are pivotally connected;
   wherein the first ends of the hydraulic actuators of the second parallelogram structure and the first ends of the first link arms of the second parallelogram structure are connected to the second connecting member along the first pivot axis.

8. Apparatus as claimed in claim 7, wherein
   the hydraulic actuators of the first and third parallelogram linkages are constrained to operate simultaneously; and
   the hydraulic actuators of the second and fourth parallelogram linkages are constrained to operate simultaneously.

9. Apparatus as claimed in claim 7, wherein the first and second connecting members are rigidly connected to each other or comprise a single unitary connecting member.

10. Apparatus as claimed in claim 7 in which a pivot pin is arranged along the first pivot axis and is connected to provide a pivot joint with the hydraulic actuators and the first link arms of the first and second parallelogram structures.

11. Apparatus as claimed in claim 7 in which the second ends of the link arms of the first parallelogram linkage of the first parallelogram structure and the third parallelogram linkage of the second parallelogram structures are pivotally connected with the platform along a second and a third pivot axes.

12. Apparatus as claimed in claim 11, wherein the second ends of the hydraulic actuators of the first and third parallelogram linkages of the first and second parallelogram structures are pivotally connected with the platform along the third pivot axis.

13. Apparatus as claimed in claim 7, wherein the second ends of the link arms of the second and fourth parallelogram linkages of the first and second parallelogram structures are pivotally connected with the base along a fourth and a fifth pivot axes.

14. Apparatus as claimed in claim 13, wherein the second ends of the hydraulic actuators of the second and fourth parallelogram linkages of the first and second parallelogram structures are pivotally connected with the base along the fifth pivot axis.

15. Apparatus as claimed in claim 7, wherein the first ends of the second link arms of the first and third parallelogram linkages of the first and second parallelogram structures are pivotally connected with the connecting member(s) along a sixth and a seventh pivot axes.

16. Apparatus as claimed in claim 7 in which the second ends of the first link arms of the first and third parallelogram linkages are pivotally connected with the platform along a second pivot axis, second ends of the second link arms of the first and third parallelogram linkages are pivotally connected with the platform along a third pivot axis, second ends of the first link arms of the second and fourth parallelogram linkages are pivotally connected with the base along a fourth pivot axis, second ends of the second link arm of the second and fourth parallelogram linkages are pivotally connected with the base along a fifth pivot axis, first ends of the second link arms of the first and third parallelogram linkages are pivotally connected with the connecting member along a sixth pivot axis and first ends of the second link arms of the second and fourth parallelogram linkages are pivotally connected with the connecting member along a seventh pivot axis.

17. Apparatus as claimed in claim 16 in which a pivot pin is arranged along one or more of the second, third, fourth, fifth and sixth pivot axes to provide a pivot joint with the link arms and hydraulic actuators of the first and second parallelogram structures.

18. Apparatus as claimed in claim 7 in which one or more of the corresponding pairs of link arms from the first and second parallelogram structures each comprise a single unitary member.

* * * * *

UNITED STATES PATENT AND TRADEMARK OFFICE
CERTIFICATE OF CORRECTION

PATENT NO. : 8,813,600 B2  
APPLICATION NO. : 13/505061  
DATED : August 26, 2014  
INVENTOR(S) : Christian Breu Page 1 of 1

It is certified that error appears in the above-identified patent and that said Letters Patent is hereby corrected as shown below:

In the Claims

Column 5, line 18, in Claim 3, delete "claim 1" and insert -- claim 1, --.

Signed and Sealed this
Fifteenth Day of September, 2015

Michelle K. Lee
*Director of the United States Patent and Trademark Office*